(12) United States Patent
Williams (10) Patent No.: US 6,400,935 B1
(45) Date of Patent: Jun. 4, 2002

(54) PILOT TONE DETECTOR

(75) Inventor: Robby Gordon Williams, Calgary (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/049,000

(22) Filed: Mar. 27, 1998

(51) Int. Cl.$^7$ ................................................. H04B 1/06
(52) U.S. Cl. ..................... 455/260; 455/265; 455/195.1; 455/192.3; 455/180.3; 331/25
(58) Field of Search ................................ 455/462, 130, 455/141, 150.1–151.4, 173.1, 180.3, 180.4, 182.3, 192.1–193.1, 196.1, 197.2, 255–266, 67.1, 67.3; 331/1–20

(56) References Cited

U.S. PATENT DOCUMENTS

| | | | | |
|---|---|---|---|---|
| 3,980,968 A | * | 9/1976 | Ma | 331/17 |
| 4,053,933 A | * | 10/1977 | Collins | 348/733 |
| 4,581,641 A | * | 4/1986 | Turner | 348/607 |
| 4,646,031 A | * | 2/1987 | Fast et al. | 331/25 |
| 4,723,189 A | * | 2/1988 | Larsen et al. | 361/76 |
| 5,253,279 A | * | 10/1993 | Satoh | 377/110 |
| 5,394,115 A | * | 2/1995 | Lampel | 331/4 |
| 5,426,397 A | * | 6/1995 | Den Hollander | 331/1 A |

OTHER PUBLICATIONS

Product Data Sheet, National Semiconductor, Feb. 1995: LMC567 Low Power Tone Decoder, pp. 1–6.
Product Data Sheet, Motorola Semiconductor, 1995, Rev. 6: MC74HC4046A Phase–Locked Loop, pp. 3–1 through 3–15.

* cited by examiner

*Primary Examiner*—Dwayne Bost
*Assistant Examiner*—Charles Craver
(74) *Attorney, Agent, or Firm*—Kevin L. Smith; Bracewell & Patterson, L.L.P.

(57) ABSTRACT

An apparatus and method for detecting the presence of a signal component in an arbitrary signal, where the signal component has a desired frequency. The apparatus includes an error signal generator and a detector. The error signal generator has an input for receiving a reference signal having a reference frequency, a second input for receiving the arbitrary signal having the signal component and an output for generating a difference signal dependent upon a difference in frequency between the reference frequency and the desired frequency. The detector has an input for receiving the difference signal and an output for producing a detector signal when the magnitude of the difference signal is greater than a threshold magnitude. The detector signal indicates the presence of the signal component in the arbitrary signal.

30 Claims, 7 Drawing Sheets

PILOT TONE DETECTOR

FIELD OF THE INVENTION

The present invention relates to a system and method for detecting a predefined signal or tone where such signal has a low signal to noise ratio.

BACKGROUND OF THE INVENTION

In a cordless telephone set having a base-station and a handset, the base-station and the handset periodically exchange control signals. For example, a control signal from the handset might instruct the base-station to release a telephone line. These control signals are digitally encoded messages contained in brief bursts lasting a few hundred milliseconds.

Duplex radio links already exist between the base-station and the handset to carry the telephone user's conversation signals. It is desirable to use this existing link to carry the control signals as well. As a result, the control signals use the same audio bandwidth as the conversation signals.

However, merely superimposing the control signals onto the conversation signals would be extremely annoying and disturbing to the user as such control signals would be audible to the user. Moreover, the user's conversation signals might corrupt the control signals by adding noise. For this reason, it is desirable that the audio channel between the base-station and the handset be time-division multiplexed to independently carry either conversation or control signals.

In a default "voice mode", the audio channel carries only conversation signals. In an occasional "data mode", the audio channel carries only control signals. To effect this kind of a esynchronous multiplexing, a handshaking signal is used.

Before either the base-station or the handset transmits a control signal, it is desirable that it indicate its intention to switch from "voice mode" to "data mode" so that both devices can mute their microphones and loudspeakers. This intention is normally indicated by inclusion of a pilot signal in a transmission from the base or handset.

The pilot signal is carried over the established radio link without disturbing the user. It is an audio tone having a predetermined frequency proximate to but outside of the telephone set's voice-band. This prevents the user from hearing any unnatural sounds or breaks in conversation.

It is important that pilot tone detection be robust. Detection must occur over a range at least as great as the telephone set voice-channel and should occur even at low signal to noise ratios. A receiver that incorrectly detects a non-existent pilot tone will unnecessarily mute its audio path. A receiver that fails to detect a real pilot tone will expose its user to an unpleasant databurst. This creates a requirement that the pilot tone path be more robust than the audio channel.

The present invention addresses the problem of pilot tone detection at low signal to noise ratios.

SUMMARY OF THE INVENTION

In accordance with one aspect of the invention, there is provided an apparatus for detecting the presence of a signal component in an arbitrary signal, where the signal component has a desired frequency. The apparatus includes an error signal generator and a detector. The error signal generator has an input for receiving a reference signal having a reference frequency, a second input for receiving the arbitrary signal having the signal component and an output for generating a difference signal dependent upon a difference in frequency between the reference frequency and the desired frequency. The detector has an input for receiving the difference signal and an output for producing a detector signal when the magnitude of the difference signal is greater than a threshold magnitude. The detector signal indicates the presence of the signal component in the arbitrary signal.

Preferably, the difference signal has a magnitude dependent upon the difference in frequency between the reference frequency and the desired frequency.

It is desirable that the error signal generator includes a duty cycle signal generator for generating a duty cycle signal having a duty cycle responsive to the difference between the reference frequency and the desired frequency.

Preferably, the error signal generator includes a phase locked loop.

It is desirable that the phase locked loop has an input for receiving the arbitrary signal and the reference signal, the arbitrary signal and the reference signal having respective leading edges, the phase locked loop producing the duty cycle signal in response to a time difference between the respective leading edges.

Preferably, the error signal generator includes a lowpass filter having an input for receiving the duty cycle signal and an output for producing the difference signal.

It is desirable that the apparatus includes a threshold signal generator for generating a threshold signal, the detector having an input for receiving the threshold signal.

Preferably, the threshold signal generator has an input for receiving a supply voltage signal representative of a supply voltage from a power supply supplying power to the error signal generator and the detector, and an output for generating the threshold signal in response to the supply voltage signal.

It is desirable that the threshold signal generator includes a voltage divider.

Preferably, the apparatus includes a bandpass filter connected to the arbitrary signal input, for bandpass filtering the arbitrary signal.

It is desirable that the bandpass filter includes a lowpass filter and a highpass filter.

In accordance with another aspect of the invention, there is provided a method for detecting the presence of a signal component in an arbitrary signal where the signal component has a desired frequency. The method includes the steps of:

a) receiving a reference signal having a reference frequency;

b) receiving the arbitrary signal having the signal component;

c) generating a difference signal dependent upon a difference in frequency between the reference frequency and the desired frequency; and c) producing a detector signal when the magnitude of the difference signal is greater than a threshold magnitude, the detector signal indicating the presence of the signal component in the arbitrary signal.

In accordance with another aspect of the invention, there is provided a signal tone detector apparatus for detecting a signal tone component having a desired frequency in a radio frequency signal in a cordless telephone having a base-station and a handset. The apparatus includes a radio frequency demodulator, an error signal generator and a detector. The radio frequency demodulator demodulates a baseband signal from the radio frequency signal transmitted between the base-station and the handset. The error signal generator has a first input for receiving a reference signal having a reference frequency, a second input for receiving the baseband signal having the signal component and an output for generating a difference signal dependent upon a difference in frequency between the reference frequency and the desired frequency. The detector has an input for receiving the difference signal and an output for producing a detector signal when the magnitude of the difference signal is greater than a threshold magnitude, the detector signal indicating the presence of the signal component in the arbitrary signal.

BRIEF DESCRIPTION OF THE DRAWINGS

In drawings which illustrate embodiments of the invention.

DETAILED DESCRIPTION

FIG. 1

Figure 1:
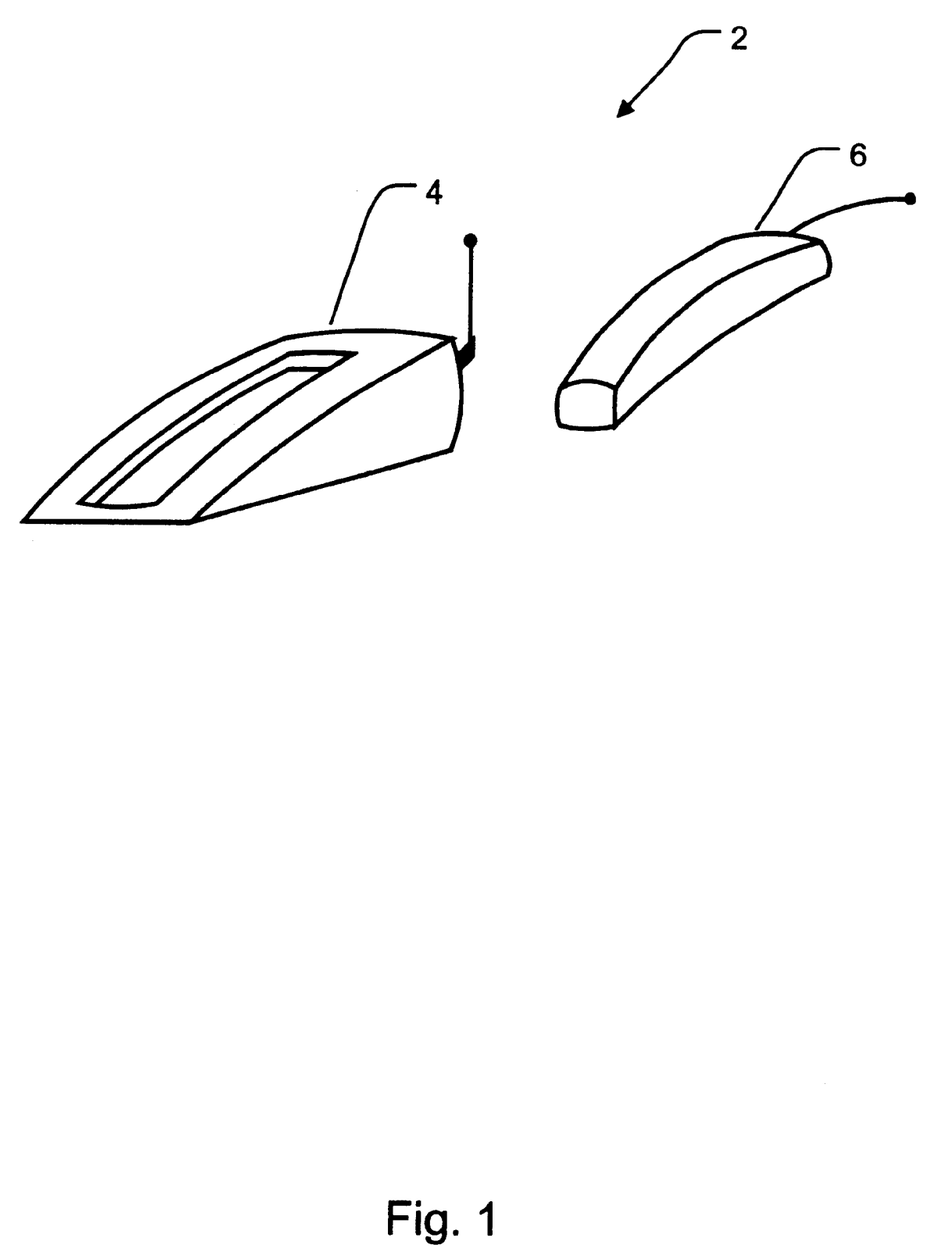
FIG. 1 is a block diagram of a cordless telephone including a base-station and a handset according to a first embodiment of the invention.

Referring to FIG. 1, a cordless telephone according to a first embodiment of the invention is shown generally at 2. The cordless telephone includes a base-station shown generally at 4 and a handset shown generally at 6. The handset and base-station are operable to communicate with each other using electromagnetic energy at a carrier frequency. The handset receives audio signals produced by the user and converts such signals into electromagnetic signals which are transmitted to the base-station 4. In addition, the handset transmits certain control signals to the base-station 4, such as dialling signals, requests for muting, paging signals and the like.

Similarly, the base-station 4 is operable to transmit signals from a telephone line (not shown) to the handset 6 for reception by the user. In addition, the base-station 4 is operable to transmit control signals to indicate ringing, for example, to the handset 6.

Control signals transmitted from the handset to the base-station or from the base-station to the handset, are transmitted in digital form and are time multiplexed with audio signals transmitted between the handset and the base-station. In order to indicate when control signals are about to be sent, the handset or base-station transmits a pilot tone signal to indicate that data is to follow. Of particular importance to this invention is the detection of such a pilot tone signal where such signal has a low signal to noise ratio.

FIG. 2

Figure 2:
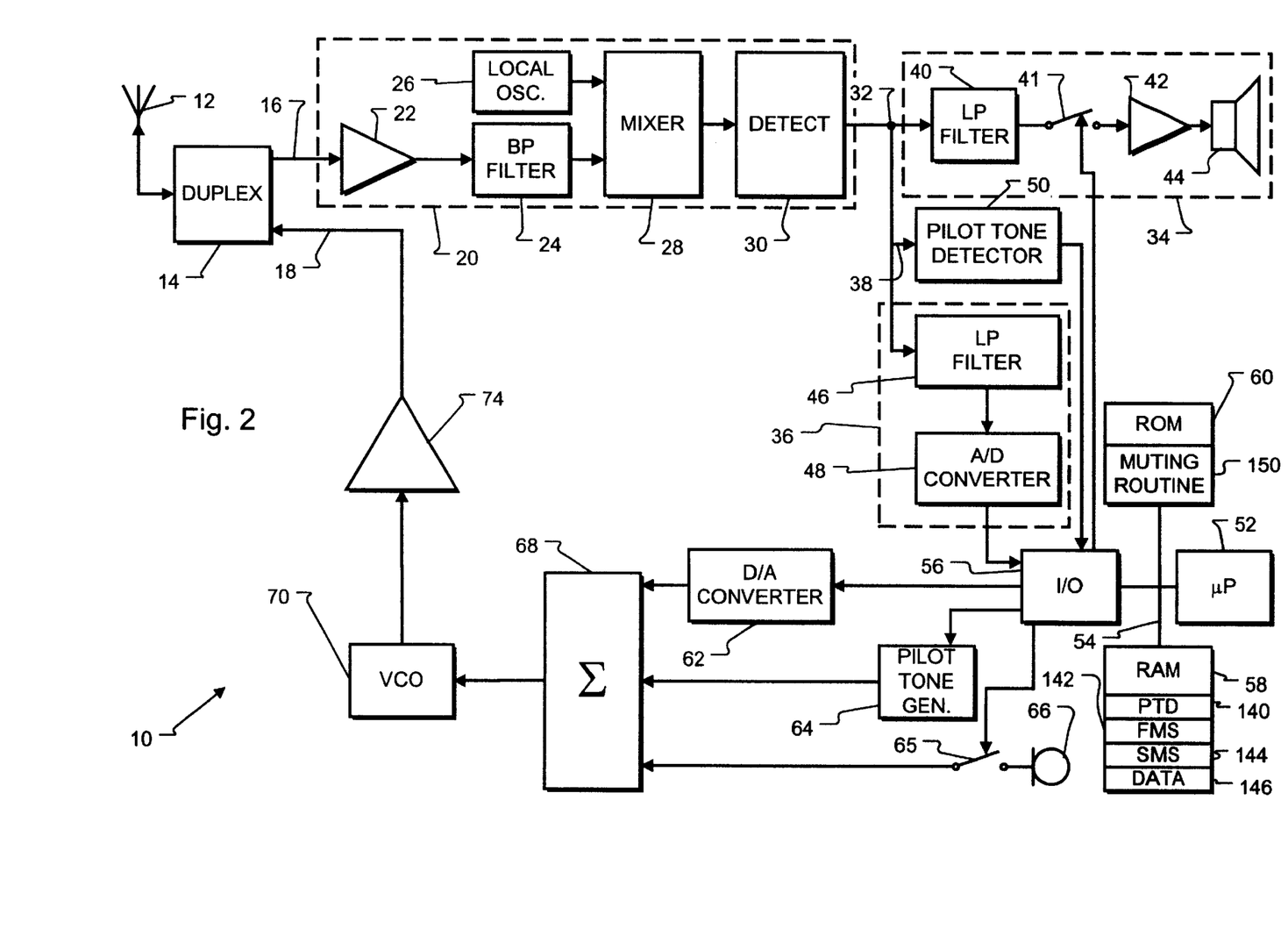
FIG. 2 is an overview block diagram of a wireless transceiver according to the first embodiment of the invention.

Referring to FIG. 2, the handset includes a transceiver according to a first embodiment of the invention as shown generally at 10. A similar transceiver is provided in the base-station 4 shown in FIG. 1.

The transceiver 10 includes an antenna 12 for transmitting and receiving modulated electromagnetic waves to and from the base-station 4 shown in FIG. 1. The antenna 12 is connected to exchange with a duplexer 14 radio frequency electrical signals that correspond to the modulated electromagnetic waves, such radio frequency electrical signals including a signal spectrum including an audio range for audio and control signals and a pilot tone range, for the pilot tone signal.

The antenna is connected to a duplexer having a receive path terminal 16 and a transmit path terminal 18. This permits fully duplexed conversations since the receiver and transmitter share the same antenna.

A conventional demodulation stage 20 is connected to the receive path terminal 16 and includes a low noise amplifier 22, a first bandpass filter 24, an intermediate frequency local oscillator 26, a first mixer 28, and a detector 30. The demodulation stage 20 has a baseband terminal 32 for producing a baseband signal representing the signal spectrum. It has been found that an MC13110 integrated circuit is a suitable foundation for the demodulation stage 20.

The baseband signal is provided to three parallel paths, namely an audio reception path 34, a data reception path 36, and a pilot tone reception path 38.

The audio reception path 34 includes a first lowpass filter 40, a normally closed first muting switch 41, an audio amplifier 42, and a loudspeaker 44 connected in series to extract and render an audio signal from the audio range of the baseband signal.

The data reception path 36 includes a second lowpass filter 46 and a 1-bit analog-to-digital converter (ADC) 48 connected in series to extract and render the digital control signal from the audio range of the baseband signal, for use by the microprocessor 52.

The pilot tone reception path 38 includes a pilot tone detector 50 for generating a pilot tone detection signal in response to detection of the pilot tone signal in the baseband signal.

FIG. 3, 4A, 4B, 4C

Pilot Tone Detector

Figure 3:
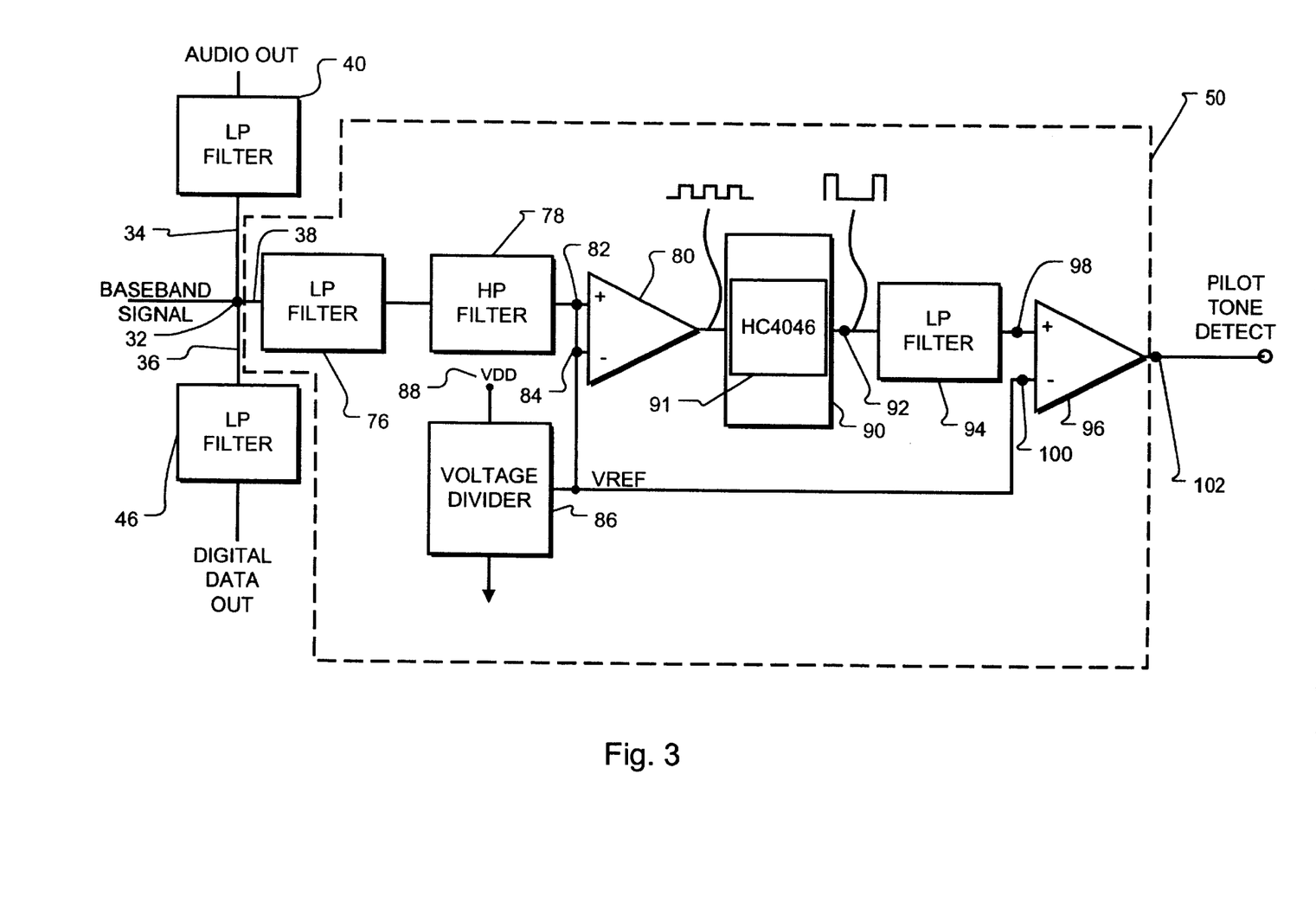
FIG. 3 is a block diagram of a pilot tone detector stage of the transceiver of FIG. 2.
Figure 4A:
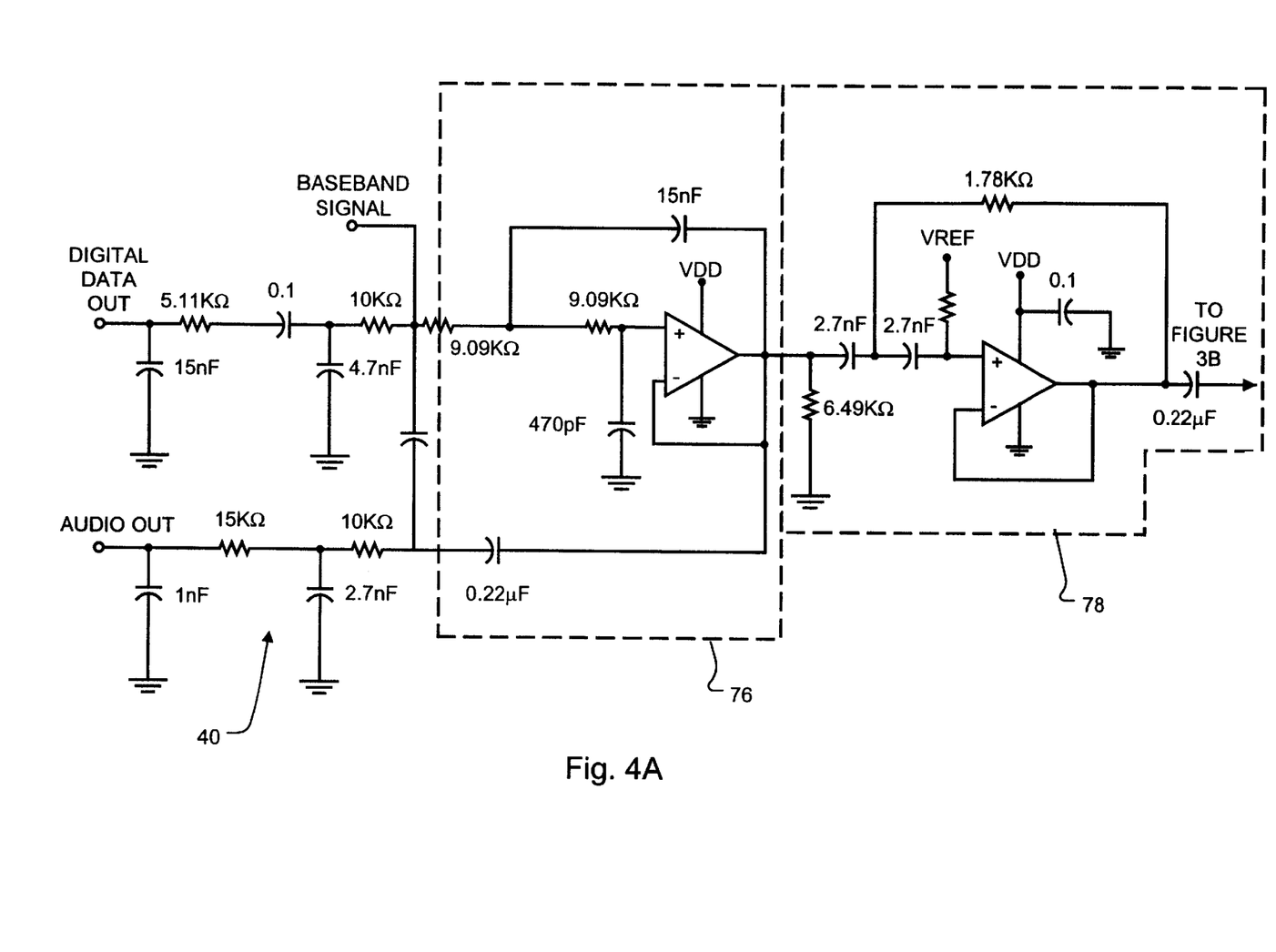
FIGS. 4A–C together form a schematic diagram of the pilot tone detector stage of FIG. 3.

Referring to FIG. 3, the pilot tone detector 50 includes a lowpass filter 76 which is connected to the baseband terminal 32 of the detector (30) to receive the baseband signal extracted by the demodulation stage (20). Referring to FIG. 4A, the third lowpass filter 76 is of the active second-order variety and is built from an operational amplifier that is configured with appropriate resistors and capacitors, as illustrated, into a Sallen-Key topology.

Referring back to FIG. 3, a highpass filter 78 is connected in series with the lowpass filter 76. Referring to FIG. 4A, the highpass filter 78 is of the active second-order variety and is built from an operational amplifier that is configured with appropriate resistors and capacitors, as illustrated, into a Sallen-Key topology. It has been found that SGS-Thomson TS3V912 operational amplifiers are suitable.

Together, the lowpass filter 76 and the highpass filter 78 form a second bandpass filter having a passband that includes the frequency of the predefined pilot tone. in this embodiment, the lowpass filter 76 has a 7 kHz cutoff frequency and the highpass filter 78 has a 6 kHz cutoff frequency such that a 1 kHz passband is formed and centered at 6.5 kHz. This improves the signal to noise ratio of the pilot tone signal.

Referring back to FIG. 3, the pilot tone detector further includes a hysteretic inverting comparator 80 having a positive input terminal 82 and a negative input terminal 84. The positive input terminal 82, is capacitively coupled to receive the bandpassed signal from the highpass filter 78. The negative input terminal 84 is DC biased through a voltage divider network 86.

Figure 4B:
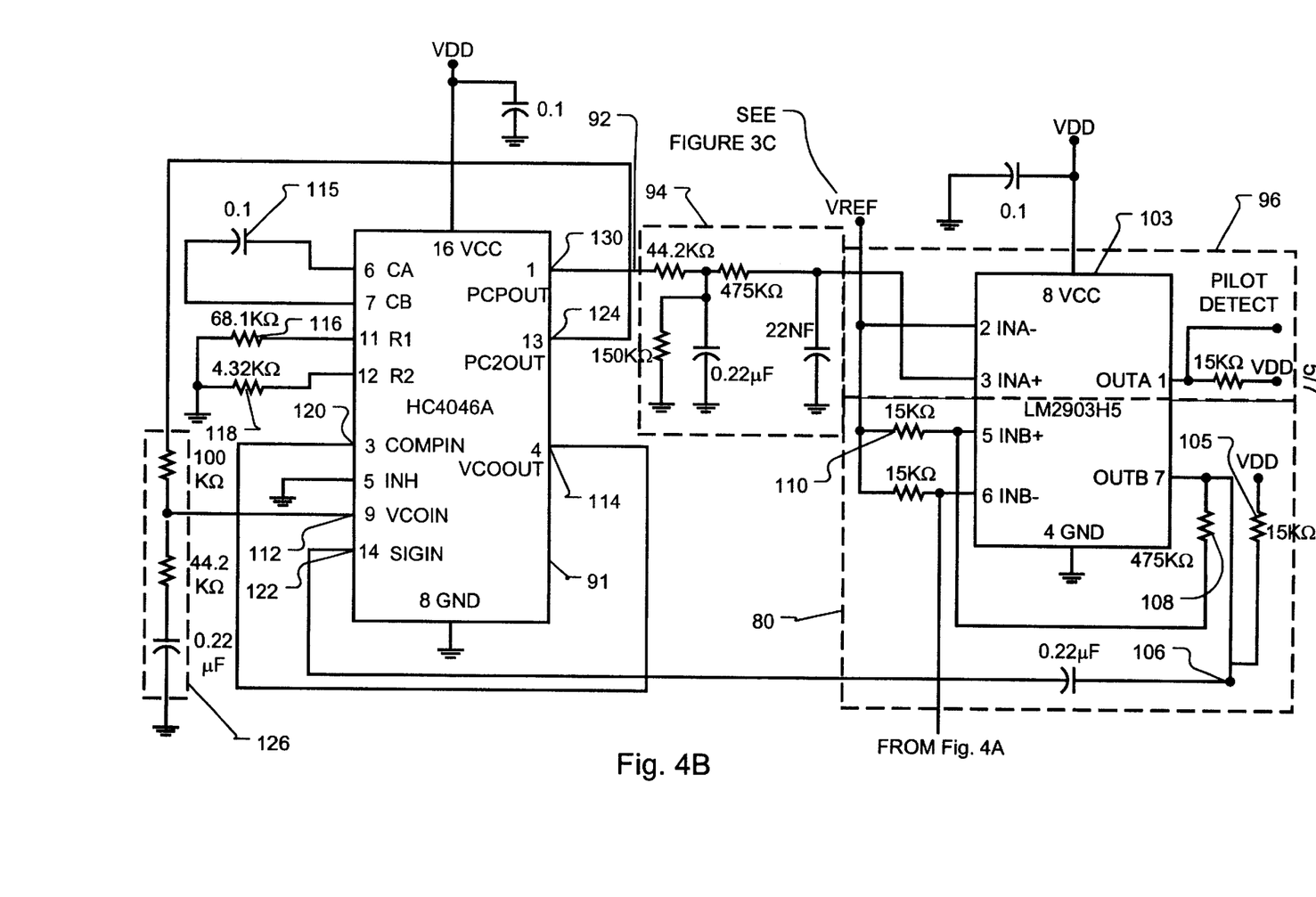

Referring to FIG. 4B, the hysteretic inverting comparator 80 is preferably formed from a cost-effective low-performance operational amplifier 103. An LM2903 operational amplifier is suitable. A pull-up resistor 105 is connected to an open-collector output terminal 106 of the operational amplifier 103. A resistive feedback divider network 108, 110 is configured to introduce the hysteresis characteristic, the amount of hysteresis depending on the ratio of the divider network 108, 110. The hysteresis window is centered at the reference voltage $V_{REF}$ supplied by the voltage divider network 86.

Figure 4C:
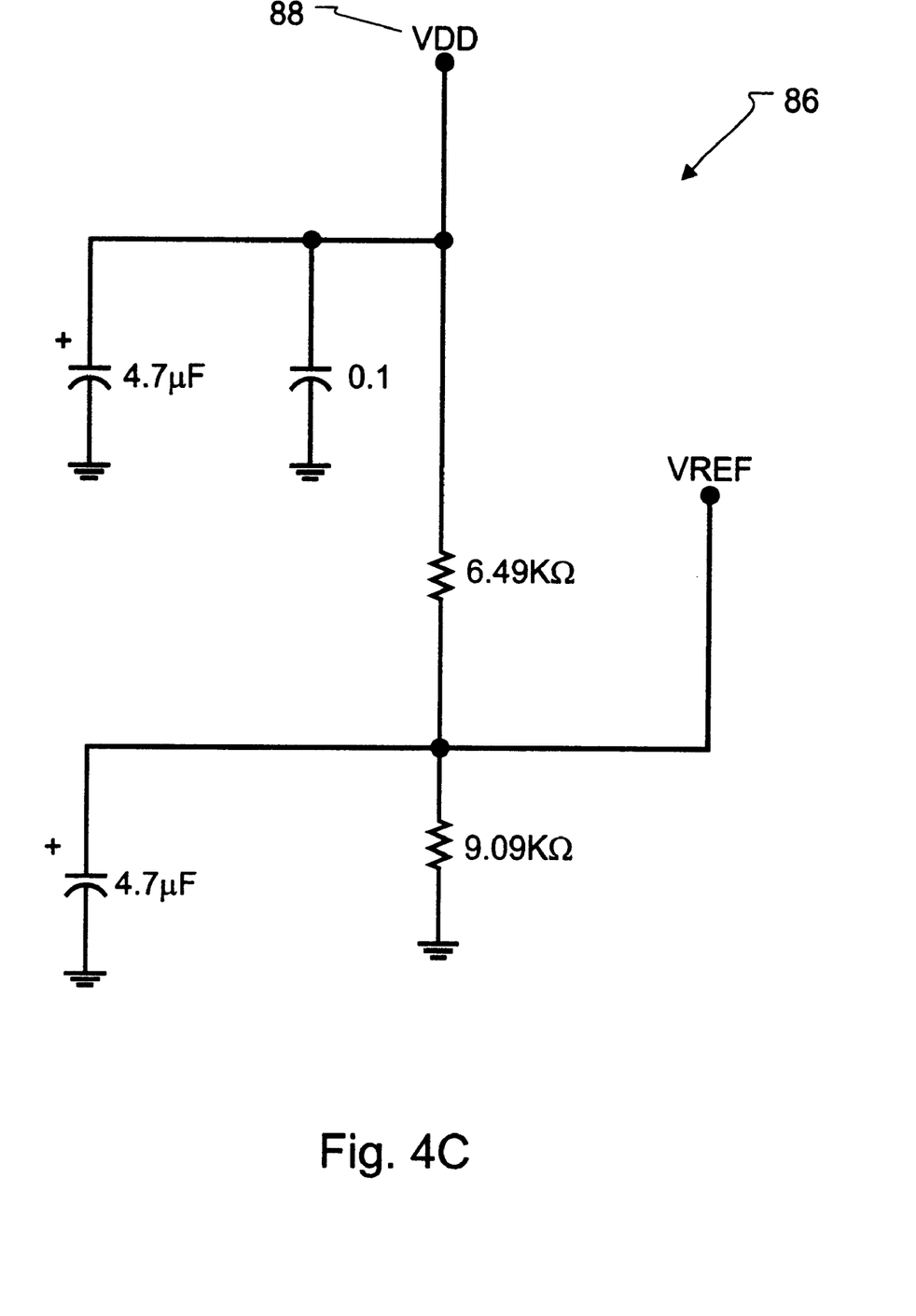

Referring to FIG. 4C, the voltage divider network 86 supplies a floating voltage reference $V_{REF}$ to the comparator which is a fixed ratio of the unregulated transceiver source voltage 88, $V_{DD}$. The floating voltage reference $V_{REF}$ is a relative measurement reference that varies with the source voltage 88 $V_{DD}$.

Effectively, the hysteretic inverting comparator 80 removes noise from and squares-up the received bandpassed signal independently of supply voltage.

The pilot tone detector further includes an error signal generator 90 connected to receive the squared signal output from the hysteretic inverting comparator 80 and to compare that signal to an internal reference signal having a frequency substantially equal to that of the predefined pilot tone. The error signal generator 90, therefore, acts as means for receiving a reference signal having a reference frequent and means for receiving an arbitrary signal having a signal component to be detected.

It has been found that a second phase-comparator stage of a MOTOROLA MC74HC4046A phase-locked loop integrated circuit 91 is effective for this purpose. Referring to FIG. 4B, the 74HC4046 phase-locked loop integrated circuit 91 includes an internal voltage controlled oscillator (VCO) (not shown) which has a control terminal 112 and an output terminal 114. The VCO supplies a periodic reference signal at its output terminal 114, the frequency of the reference signal being determined by the voltage present at the control terminal 112, by a timing capacitor 115, and by first and second time constant resistors 116, 118. These components also set the upper and lower frequency boundaries for the VCO reference signal. The components are selected to narrowly bracket the frequency of the predefined pilot tone being sought so that the VCO can only lock onto a narrow range of frequencies proximate to the predefined pilot tone frequency.

The 74HC4046 phase-locked loop integrated circuit 91 also includes a phase comparator designated PC2 (not shown) having a reference signal input terminal 120 and a test signal input terminal 122. The phase comparator PC2 is sensitive to the time interval between the leading edge of a signal applied to its reference signal input terminal 120 and the leading edge of a signal applied to its test signal input terminal 122. In this embodiment, the VCO output terminal 114 is fed back into the PC2 reference signal input terminal 120 and the output of the hysteretic inverting comparator 80 is connected to the PC2 test signal input terminal 122. An edge-detecting device such as the PC2 phase comparator is particularly vulnerable to noise. It is for this reason that the hysteresis characteristic of the hysteretic inverting comparator 80 is so desirable.

The phase comparator PC2 has a tri-state output terminal 124. During any interval when a leading edge of a signal applied to its reference signal input terminal 120 lags a leading edge of a signal applied to its test signal input terminal 122, the PC2 output terminal 124 has a logical high level. In contrast, during any time interval a leading edge of a signal applied to its reference signal input terminal 120 leads a leading edge of a signal applied to its test signal input terminal 122, the output terminal 124 has a logical low level. During all other times, the output terminal 124 has a high impedance off-state.

The PC2 output terminal 124 is connected back to the VCO control terminal 112 through a lowpass filter 126 to urge the VCO to adjust the frequency of its internal reference signal to approach the frequency of the signal applied to the PC2 test signal input terminal 122. The VCO reference signal frequency can only vary within the narrow range established by the timing capacitor 115 and the first and second time constant resistors 116, 118. The lowpass filter 126 reduces the jitter and noise of the signal feedback from the PC2 output terminal 124 without unduly delaying frequency locking.

The 74HC4046 also includes a error signal output terminal 130 that has a logical high state at all times except during intervals when the leading edge of the signal applied to the PC2 reference signal input terminal 120 either leads or lags the leading edge of the signal applied to the PC2 test signal input terminal. Therefore, the duty cycle of this error signal represents how closely the arbitrary test signal is in phase with the internal reference signal, or put another way, how similar their frequencies are. In this sense, the phase comparator PC2 functions as a duty cycle signal generator for generating a duty cycle signal.

Referring back to FIG. 3, the error signal generator 90 includes an error signal node 92 for supplying an error signal, or difference signal, having a duty cycle that varies with the frequency difference between the received test signal and the internal reference signal. The error signal generator 90 therefore, acts as means for generating a difference signal dependent upon a difference in frequency between a reference frequency and desired frequency. In effect, the error signal generator acts as a high-Q filter which further improves signal to noise ratio.

The pilot tone detector further includes a lowpass filter 94 connected to the error signal node 92 to receive the error signal for averaging into a slowly varying voltage level. The lowpass filter 94 is of the passive second-order variety, and is formed from various resistors and capacitors as illustrated. The lowpass filter 94 is connected to average the error signal to yield a voltage level that corresponds to the duty cycle of the error signal. The lowpass filter 94 is optimized to remove transition noise from the error signal while still converging quickly on the average of the error signal. It has been found that a cutoff frequency of 16 Hz is suitable. Thus, the lowpass filter further improves signal to noise ratio.

The pilot tone detector further includes a detector comparator 96 having a test terminal 98 and a reference terminal 100. The test terminal 98 is connected to receive the voltage level average by the lowpass filter 94. The reference terminal is connected to the voltage divider network 86 to receive the floating reference voltage $V_{REF}$, which is a fixed ratio of the transceiver source voltage 88 $V_{DD}$.

The detector comparator 96 further includes an output terminal 102 for supplying a detection signal that represents the presence of the pilot tone by its logical high level and the absence of the pilot tone by its logical low level. This detection signal is the pilot tone detection signal. The detector comparator 96 is connected to receive the average error signal at its test terminal 98 and to compare it to the reference level, or threshold magnitude, at its reference terminal 100 as established by the voltage divider network 86 which functions as a threshold signal generator. Therefore, the detector comparator functions as means for producing a pilot tone detector signal when the magnitude of the difference signal is greater than a threshold magnitude, the detector signal indicating the presence of the signal component in the arbitrary signal.

The pilot tone detection signal has a logical high state for representing the presence of the pilot tone signal and a logical low state for representing the absence of the pilot tone signal. It can, therefore, be seen that the pilot tone detector 50 functions as means for detecting the presence of a signal component, namely the pilot tone in an arbitrary signal, the baseband signal.

As the logical high state of the error signal output terminal 130 has a voltage level set by the source voltage and as the source becomes depleted, the logical high voltage level drops from its fully charged level. This effect is further propagated through the lowpass filter 94. However, as the reference terminal of the comparator 96 is connected to the floating reference voltage $V_{REF}$, the comparison of the signal output by the lowpass filter with the reference voltage made by the comparator is a relative comparison which is independent of supply voltage. Thus, the pilot tone detection signal is produced independently of supply voltage. This further improves robustness of pilot tone detection.

Preferably, the pilot tone signal has a frequency just above the telephone set voice-band, for example, 6.5 kHz. The use of a higher frequency pilot tone would require a demodulation stage 20 having an unduly wide passband, which would compromise sensitivity and noise rejection and would reduce range. The use of a pilot tone signal having a frequency within the voice-band would disturb the user. The use of a pilot tone signal having a frequency below the voice-band would generally take too long to detect because of its long period.

Referring back to FIG. 2, the transceiver further includes a microprocessor 52 having conventional data and address busses collectively shown at 54 connected to an input/output (I/O) port 56, random access memory (RAM) 58, and read only memory (ROM) 60.

The I/O port 56 is in communication with the first muting switch 41, the ADC 48, the pilot tone detector 50, a 1-bit digital-to-analog converter DAC 62, a pilot tone generator 64, and a normally closed second muting switch 65, which are thereby controlled by the microprocessor.

The transceiver further includes a microphone 66 which produces an audio signal in response to utterances from the user and supplies that signal to the second muting switch 65.

The transceiver further includes a summing junction 68 which is connected to receive for superposition the signals produced by the DAC 62, the pilot tone generator 64, and the microphone 66. A voltage controlled oscillator 70 is connected to receive the composite signal from the summing junction 68 to produce a modulated radio frequency signal. A radio frequency amplifier 74 is connected to receive the modulated radio frequency signal and to provide it to the transmit path terminal 18 of the duplexer 14 for transmission at the antenna 12.

The RAM 58 is configured to include two receive buffers and two transmit buffers, including a pilot tone detected receive buffer 140 for holding a value representing the current state of the pilot tone detection signal, a first mute switch transmit buffer 142 for holding a value representing the current state of the first mute switch 41, a second mute switch transmit buffer 144 for holding a value representing the current state of the second muting switch 65, and a FIFO data receive buffer 146 for holding digital data messages extracted by the data reception path 36.

The pilot tone detected receive buffer 140 is one bit long and is loaded with a 1-value by the microprocessor 52 when the pilot tone detection signal has a logical high state and is loaded with a 0-value when the pilot tone detection signal has a logical low state. This buffer is also loaded by the microprocessor when data is to be transmitted from the handset to the base.

The first mute switch transmit buffer 142 is one bit long and is loaded by the microprocessor with a 1-value when the first muting switch 41 is to be closed and is loaded with a 0-value when the first muting switch 41 is to be opened. A further routine (not shown) writes the contents of the first mute switch transmit buffer 142 to the I/O port 56 to control the first Muting Switch.

The second mute switch transmit buffer 144 is one bit long and is loaded by the microprocessor with a 1-value when the second muting switch 65 is to be closed and is loaded with a 0-value when the second muting switch 65 is to be opened. A further routine (not shown) writes the contents of the second mute switch transmit buffer 142 to the I/O port 56 to control the second Muting Switch.

The FIFO data receive buffer 146 is sized to hold the anticipated maximum length digital data message received from the data reception path 36.

Figure 5:
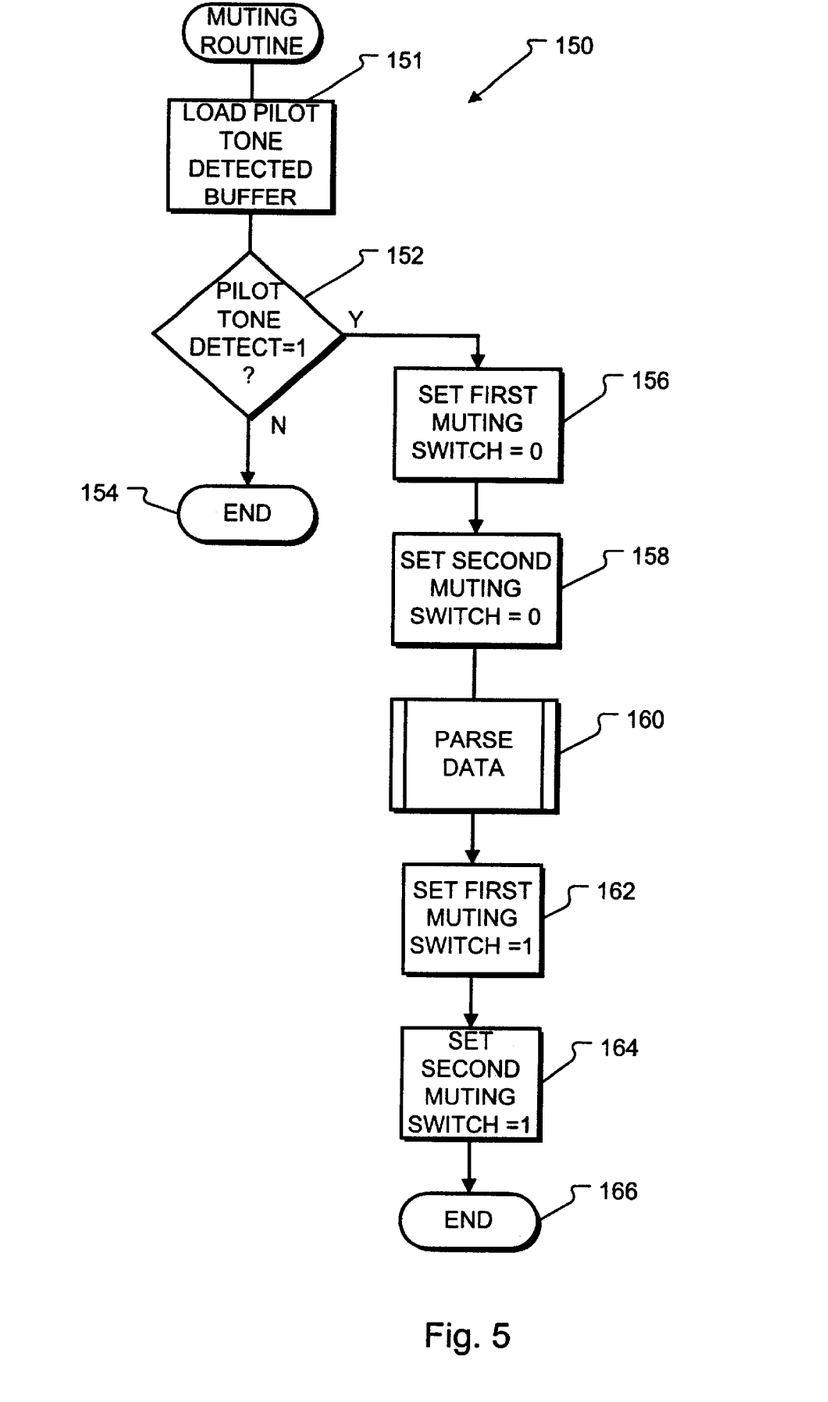
FIG. 5 is a flowchart of a Muting Routine run by a microprocessor of the wireless transceiver.

The ROM 60 is programmed with codes representing instructions for directing the microprocessor 52 to perform various functions, including a Muting Routine shown generally at 150 in FIG. 5.

Operation

Referring to FIG. 1, generally, when the base-station 4 intends to transmit data instead of audio signals, it renders active the pilot tone signal while the audio signal is being transmitted, to indicate that data will follow. The pilot tone is a pure tone having a frequency of 6.5 kHz.

With reference now to FIG. 2, an overview of the operation of the transceiver 10 will now be discussed.

Referring to FIG. 2, when a radio frequency signal is received at the antenna 12, it passes through the duplexer 14 to its receive path terminal 16. The radio frequency signal is amplified by the low noise amplifier 22 and filtered to the appropriate passband by the first bandpass filter 24. At the first mixer 28, the amplified and filtered radio frequency signal is mixed with the demodulating intermediate frequency signal generated by the first local oscillator 26. This mixed signal is then passed to the detector 30, which removes the intermediate frequency carrier and supplies the underlying baseband signal to the baseband terminal 32.

The baseband signal passes through the three reception paths 34, 36, 38 for signal extraction. The first lowpass filter 40 and the audio amplifier 42 extract any audio signal for transmission through to the audio speaker 44, depending on the state of the normally closed first muting switch 41. At this point in the operation, the first muting switch transmit buffer contains a 1 and, therefore, the first muting switch 41 is closed and audio signals are passed to the audio speaker.

Pilot Tone Detector

Referring to FIGS. 3 and 4A–4C, the baseband signal at the baseband terminal 32 of the detector 30 enters in succession the lowpass filter 76 and the highpass filter 78 which narrow the spectrum of the baseband signal to a predetermined passband that surrounds the frequency of the pilot tone.

The bandpassed signal then is passed to the hysteretic inverting comparator 80, which in effect yields a square-wave signal having the frequency of the dominant component of the bandpassed signal. The hysteretic inverting comparator 80 generates a square-wave bandpassed signal that is completely defined as either a logical high level, a logical low level, or a transition between the two levels.

The square-wave bandpassed signal is then provided to the test signal input terminal 122 of the second phase comparator PC2 in the error signal generator 90. The error signal generator 90 compares the square-wave signal to the internal reference signal generated by the VCO (not shown). In response, the error signal terminal 130 has a logical high level ($V_{DD}$) except during intervals when the leading edge of the reference signal either leads or lags the leading edge of the square-wave signal, in which case it has a logical low level (ground). It can therefore be seen that the duty cycle of the error signal is relatively large when the reference signal and the square-wave signal are of similar frequency and is relatively small when those two signals have dissimilar frequencies.

The lowpass filter 94 receives the error signal and averages it to yield a voltage level that varies with the duty cycle of the error signal. This average signal is supplied to the detector comparator 96 for comparison with the relative voltage reference $V_{REF}$ provided by the voltage divider network 86 with reference to the source voltage 88 $V_{DD}$. If the average signal is sufficiently high compared to the reference signal $V_{REF}$, then the comparator output signal has a logical high level, which indicates that the pilot tone is present in the baseband signal.

Alternatively, if the average signal is sufficiently low compared to the reference signal $V_{REF}$, then the comparator output signal has a logical low level, which indicates that the pilot tone is absent in the baseband signal. The pilot tone detector 50 thus transmits a pilot tone detection signal to the microprocessor 52 via the I/O port 56 whenever a pilot tone is present in the baseband signal.

Muting Routing

Referring now to FIGS. 2 and 5, the Muting Routine 150 encoded in ROM 60 and executed by the microprocessor 52 includes block 151 which directs the microprocessor 52 to load the pilot tone detected receive buffer 140 with a "1" if the pilot tone detection signal has a logical high state or with a "0" if the pilot tone detection signal has a logical low state.

Block 152 then directs the microprocessor 52 to check the contents of the pilot tone detected receive buffer 140. If the contained value is 0, then block 154 directs the microprocessor 52 to end the Muting Routine 150 and the transmission and reception of audio signals is maintained.

Alternatively, if the contained value is 1, then block 156 directs the microprocessor 52 to load a 0 value into the first mute switch transmit buffer 142 and to cause the I/O port 56 to supply that value to the first muting switch 41 to open the muting switch to disconnect the speaker 44 from the audio reception path 34.

Block 158 then directs the microprocessor 52 to load a 0 value into the second mute switch transmit buffer 144 to cause the I/O port 56 to supply that value to the second muting switch 65 thereby disconnecting the microphone 66 from the summing junction 68. Thus, the first and second muting switches 41, 65 are directed to open, thereby disconnecting the speaker 44 and the microphone 66. This shields the user from hearing FSK bursts of control data in the data signal subsequently transmitted from the base station or from FSK bursts in any reply data signal produced by the D/A converter. Thus, the transmission and reception of audio signals is interrupted or muted, while data signals are transmitted or received in the audio band.

While the audio path is muted, block 160 directs the microprocessor 52 to call a subroutine to parse the contents of the FIFO data receive buffer 146 to obtain data for use in other routines, not part of the invention. This parsing subroutine is not specified herein except that after the buffered data has been parsed and operated upon, the subroutine directs the microprocessor 52 to return to the Muting Routine 150.

After the parsing subroutine is ended, block 162 directs the microprocessor 52 to load a 1 value into the first mute switch transmit buffer 142 to cause the I/O port 56 to supply that value to the first muting switch 41 thereby closing the switch and reconnecting the speaker 44 to the audio reception path 34. Block 164 then directs the microprocessor 52 to load a 1 value into the second mute switch transmit buffer 144 to cause the I/O port 56 to supply that value to the second muting switch 65 thus reconnecting the microphone 66 to the summing junction 68. The audio path is thus unmuted or restored after data communications have taken place.

Block 166 then directs the microprocessor 52 to end the Muting Routine 150.

If the handset is required to initiate the transfer of data to the base-station, the microprocessor 52 enables the pilot tone generator 64 and loads a "1" into the pilot tone detected receive buffer 140. The pilot tone and any audio signal generated by the microphone 66 are superimposed at the summing junction 68 to produce a baseband signal which controls the voltage controlled oscillator 70 to produce a modulated radio frequency signal which is amplified by the radio frequency amplifier 74 and then supplied to the transmit path terminal 18 of the duplexer 14 for transmission through the antenna 12. This radio frequency signal is received at the base-station where the pilot tone signal is detected as described above.

The loading of the "1" into the pilot tone detected receive buffer 140 initiates the muting routine as described above with the exception that at block 160 instead of parsing data from a FIFO data receive buffer 146, data is parsed from a transmit buffer (not shown) and is presented to the D/A converter 62 which produces a modulation signal which is presented to the voltage controlled oscillator 70 through the summing junction 68, to produce the radio frequency signal for transmission to the base.

While specific embodiments of the invention have been described and illustrated, such embodiments should be considered illustrative of the invention only and not as limiting the invention as construed in accordance with the accompanying claims.

What is claimed is:

1. An apparatus for detecting the presence of a signal component in an arbitrary signal, said signal component having a single desired frequency, the apparatus comprising:
    a) an error signal generator having an input for receiving a reference signal having a reference frequency, a second input for receiving said arbitrary signal having said signal component and an output for generating a difference signal dependent upon a difference in frequency between said reference frequency and said desired frequency; and
    b) a detector having an input for receiving said difference signal and an output for producing a detector signal only when the magnitude of said difference signal is greater than a threshold magnitude, said detector signal indicating the presence of said signal component in said arbitrary signal.

2. An apparatus as claimed in claim 1 wherein said difference signal has a magnitude dependent upon said difference in frequency between said reference frequency and said desired frequency.

3. An apparatus as claimed in claim 2 wherein said error signal generator includes a duty cycle signal generator for generating a duty cycle signal having a duty cycle responsive to the difference between said reference frequency and said desired frequency.

4. An apparatus as claimed in claim 3 wherein said error signal generator includes a phase locked loop.

5. An apparatus as claimed in claim 4 wherein said phase locked loop has an input for receiving said arbitrary signal and said reference signal, said arbitrary signal and said reference signal having respective leading edges, said phase locked loop producing said duty cycle signal in response to a time difference between said respective leading edges.

6. An apparatus as claimed in claim 3 wherein said error signal generator includes a lowpass filter having an input for receiving said duty cycle signal and an output for producing said difference signal.

7. An apparatus as claimed in claim 1 further including a threshold signal generator for generating a threshold signal, said detector having an input for receiving said threshold signal.

8. An apparatus as claimed in claim 7 wherein said threshold signal generator has an input for receiving a supply voltage signal representative of a supply voltage from a power supply supplying power to said error signal generator and said detector, and an output for generating said threshold signal in response to said supply voltage signal.

9. An apparatus as claimed in claim 8 wherein said threshold signal generator includes a voltage divider.

10. An apparatus as claimed in claim 1 further including a bandpass filter connected to said arbitrary signal input, for bandpass filtering said arbitrary signal.

11. An apparatus as claimed in claim 10 wherein said bandpass filter includes a lowpass filter and a highpass filter.

12. A method for detecting the presence of a signal component in an arbitrary signal, said signal component having a single desired frequency, the method comprising the steps of:
   a) receiving a reference signal having a reference frequency,
   b) receiving said arbitrary signal having said signal component;
   c) generating a difference signal dependent upon a difference in frequency between said reference frequency and said desired frequency; and
   d) producing a detector signal only when the magnitude of said difference signal is greater than a threshold magnitude, said detector signal indicating the presence of said signal component in said arbitrary signal.

13. A method as claimed in claim 12 wherein said difference signal has a magnitude dependent upon said difference in frequency between said reference frequency and said desired frequency.

14. A method as claimed in claim 13 further including the step of generating a duty cycle signal having a duty cycle responsive to the difference between said reference frequency and said desired frequency.

15. A method as claimed in claim 14 wherein said arbitrary signal and said reference signal having respective leading edges, the method further including the step of producing said duty cycle signal in response to a time difference between said respective leading edges.

16. A method as claimed in claim 14 further including the step of lowpass filtering said duty cycle signal to produce said difference signal.

17. A method as claimed in claim 12 further including the step of generating a threshold signal.

18. A method as claimed in claim 17 further including the step of receiving a supply voltage signal representative of a supply voltage from a power supply and generating said threshold signal in response to said supply voltage signal.

19. A method as claimed in claim 12 further including the step of bandpass filtering said arbitrary signal.

20. A method as claimed in claim 19 further including the step of lowpass filtering and highpass filtering said arbitrary signal.

21. An apparatus for detecting the presence of a signal component in an arbitrary signal, said signal component having a single desired frequency, the apparatus comprising;
   a) means for receiving a reference signal having a reference frequency,
   b) means for receiving said arbitrary signal having said signal component;
   c) means for generating a difference signal dependent upon a difference in frequency between said reference frequency and said desired frequency; and
   d) means for producing a detector signal only when the magnitude of said difference signal is greater than a threshold magnitude, said detector signal indicating the presence of said signal component in said arbitrary signal.

22. An apparatus as claimed in claim 21 wherein said difference signal has a magnitude dependent upon said difference in frequency between said reference frequency and said desired frequency.

23. An apparatus as claimed in claim 22 further including means for generating a duty cycle signal having a duty cycle responsive to the difference between said reference frequency and said desired frequency.

24. An apparatus as claimed in claim 23 wherein said arbitrary signal and said reference signal having respective leading edges, the apparatus further including means for producing said duty cycle signal in response to a time difference between said respective leading edges.

25. An apparatus as claimed in claim 23 further including means for lowpass filtering said duty cycle signal to produce said difference signal.

26. An apparatus as claimed in claim 21 further including means for generating a threshold signal.

27. An apparatus as claimed in claim 26 further including means for receiving a supply voltage signal representative of a supply voltage from a power supply and generating said threshold signal in response to said supply voltage signal.

28. An apparatus as claimed in claim 21 further including means for bandpass filtering said arbitrary signal.

29. An apparatus as claimed in claim 28 further including means for lowpass filtering and highpass filtering said arbitrary signal.

30. A signal tone detector apparatus for detecting a signal tone component having a single desired frequency in a radio frequency signal in a cordless telephone having a base-station and a handset, the apparatus comprising:
   a) a radio frequency demodulator for demodulating a baseband signal from said radio frequency signal transmitted between said base-station and said handset;

b) an error signal generator having an input for receiving a reference signal having a reference frequency, a second input for receiving said baseband signal having said signal component and an output for generating a difference signal dependent upon a difference in frequency between said reference frequency and said desired frequency; and c) a detector having an input for receiving said difference signal and an output for producing a detector signal only when the magnitude of said difference signal is greater than a threshold magnitude, said detector signal indicating the presence of said signal component in said arbitrary signal.

\* \* \* \* \*